(12) United States Patent
Winner

(10) Patent No.: US 7,138,909 B2
(45) Date of Patent: Nov. 21, 2006

(54) DEVICE FOR PROVIDING SIGNALS IN A MOTOR VEHICLE

(75) Inventor: Hermann Winner, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 10/239,589

(22) PCT Filed: Dec. 4, 2001

(86) PCT No.: PCT/DE01/04569

§ 371 (c)(1),
(2), (4) Date: Mar. 24, 2003

(87) PCT Pub. No.: WO02/058975

PCT Pub. Date: Aug. 1, 2002

(65) Prior Publication Data

US 2005/0060071 A1    Mar. 17, 2005

(30) Foreign Application Priority Data

Jan. 23, 2001   (DE) ................ 101 02 771

(51) Int. Cl.
*B60Q 1/00*       (2006.01)
(52) U.S. Cl. ............... 340/438; 340/903; 340/436
(58) Field of Classification Search ............... 340/438, 340/903, 435, 436, 437
See application file for complete search history.

(56) References Cited

U.S. PATENT DOCUMENTS 6,084,508 A    7/2000   Mai et al.
6,553,130 B1 *  4/2003   Lemelson et al. .......... 382/104

FOREIGN PATENT DOCUMENTS

| DE | 38 30 790  | 3/1990  |
| DE | 195 34 942 | 5/1998  |
| DE | 198 28 693 | 12/1999 |
| DE | 199 25 643 | 12/1999 |
| EP | 0 976 627  | 10/1998 |
| EP | 0 936 472  | 8/1999  |

\* cited by examiner

*Primary Examiner*—Daryl C. Pope
(74) *Attorney, Agent, or Firm*—Kenyon & Kenyon LLP

(57) ABSTRACT

A device and an associated method are provided, in which a function processes input variables and generates functional output signals. These output signals are stored and held in readiness for readout operations. Given the presence of specific conditions, an instantaneous data record is safeguarded in a nonvolatile memory device until it has been read out via an interface. The control device and the associated method make it possible to test control possibilities planned in future, without having to fear unexpected and unwanted function reactions which have an effect on the vehicle dynamics.

14 Claims, 3 Drawing Sheets

DEVICE FOR PROVIDING SIGNALS IN A MOTOR VEHICLE

FIELD OF THE INVENTION

The present invention relates to a device and an associated method, in which a function is provided which processes input variables and generates functional output signals. These output variables are prepared, stored and held in readiness for readout operations. Given the presence of specific surrounding-field data, an instantaneous data record is safeguarded in a nonvolatile memory device until it has been read out via an interface. This control device and the associated method make it possible to test control possibilities planned in future in vehicles, without having to fear unexpected and unwanted function reactions which have an effect on the vehicle dynamics. The function provided in the control device may advantageously be an algorithm which is able to recognize the probability of a collision of one's own vehicle with a target object, and optionally is able to initiate a full braking or a steering intervention or a combination of both. In this context, the full braking represents a deceleration of the vehicle which lies in the range of the maximum possible deceleration for the vehicle in question.

BACKGROUND INFORMATION

European Published Patent No. 0 976 627 discusses a braking control for a vehicle. If a radar system of a vehicle having braking control detects an object in front of the vehicle, then an estimating device judges the probability that the vehicle will collide with the object. If the estimation judgment reveals that a collision probability exists, then an automatic braking unit brings about an automatic braking to avoid an imminent collision. If, during the automatic braking, a driver-activated braking input is detected, then the urgency of the driver braking is estimated and the automatic braking control generates a braking force which corresponds to the driver input. A gentle transition from the automatic braking to the driver-controlled braking thereby results.

German Published Patent No. 38 30 790 discusses a method and a device for the automatic avoidance of collisions for automatically controllable vehicles. With the aid of this method and device, in danger situations caused by obstacles, the intention is to carry out a collision-avoiding acceleration, braking and/or evasive maneuver using an automatic collision avoidance system. This is accomplished by a hierarchically constructed method and by an associated device, data of the vehicle and its setpoint path being acquired by sensors, and setpoint signals of the vehicle path ascertained therefrom being fed to a second hierarchical step of a collision-avoidance device together with the data of an obstacle path acquired, for example, by sensors, and above that, in a third hierarchical step, the final controlling elements of the vehicle control are triggered along the lines of a collision avoidance.

SUMMARY OF THE INVENTION

The present invention is based on a device for making signals available in a motor vehicle, as a function of input signals, particularly regarding distance and relative velocity with respect to an object in the direction of travel. Provision is made in a device according to an exemplary embodiment of the present invention for a function which prepares, stores and holds non-convertible manipulated variables in readiness for readout operations for the specific vehicle. The non-convertible manipulated variables are output signals of the function which could be output to final controlling elements, but which are obtained and stored for evaluation purposes.

The function, which is provided in the device, may advantageously relate to control possibilities intended in future. They may advantageously be vehicle functions which represent future functionalities in motor vehicles.

It may also be advantageous that the non-convertible manipulated variables, which are made available by the function, represent the triggering and implementation of an automatic braking and an automatic steering intervention, respectively, a deceleration which lies in the range of the maximum possible deceleration for the vehicle in question being provided in particular as braking, and as steering intervention, a steering movement of the wheels of the motor vehicle being provided such that evasion of an obstacle is made possible in time. A safety system of this type assumes an active braking device which may be triggered electronically and independently of a brake pedal actuation, and assumes an electronically controlled steering which may be triggered independently of a steering wheel motion.

Moreover, it may be advantageous that the function provided, as part of the control device, may be supplied with at least one of the following variables as input variable:
   distance to the vehicle in front,
   relative velocity of the vehicle in front with respect to one's own vehicle,
   sway of the vehicle in front relative to one's own vehicle,
   velocity of one's own vehicle,
   acceleration of one's own vehicle,
   yaw rate,
   lateral acceleration of one's own vehicle,
   steering wheel angle,
   relative lateral velocity of the vehicle in front with respect to one's own vehicle,
   width of the detected target object,
   height of the detected target object, and
   road coefficient of friction.

According to an exemplary embodiment of the present invention, it may not be necessary that all the variables listed be supplied to the function; only one or several of the variables specified, or additional variables not named may also be fed to the function.

The input variables of the intended function may advantageously be made available by at least one of the following devices:
   radar sensor,
   lidar sensor,
   video sensor,
   stereo video sensor,
   yaw rate sensor,
   steering angle sensor, or
   wheel speed sensor.

Furthermore, provision is made within the scope of an exemplary embodiment of the present invention that one or more of these sensors is connected to a control unit, and the function of the exemplary embodiment receives input variables from this control unit. For example, the wheel speed may be supplied to the function from an ABS control unit or from a control unit of an electronic stability program.

Furthermore, it may be advantageous that an activation signal may be given to the control device from outside, whereby the non-convertible manipulated variables of the provided function are able to be output to final controlling elements, and thus become convertible manipulated variables. This activation, executable at any time, may also be deactivated again at any time, in that the control device receives a deactivation signal from outside which influences the provided function in such a manner that the convertible manipulated variables become non-convertible manipulated variables.

Another advantage may be that the variables made available by the function, and the data which belong to the variables and are decisive for forming them, as well as further data which indicate the moment and the situation of the triggering signal, are stored in a nonvolatile memory and are held in readiness there for readout operations.

It may be advantageous that the control device in which the function is provided is a device for adaptive cruise control.

The adaptive cruise control may advantageously includes a stop-&-go control by which the speed-controlled vehicle is braked until it comes to a standstill, and after standstill, may be started up again autonomously or after driver acknowledgment, as may occur in queues at traffic signals or during traffic jams.

It may be advantageous that the stored variables, as well as the associated data, may only be overwritten after the readout.

It may also be advantageous that a design protects the nonvolatile memory device from destruction caused by an accident, so that even after a collision and associated destruction of the device in which the function of an exemplary embodiment of the present invention is provided, readout of the stored data is possible.

Moreover, it may be advantageous that the triggering signal for a braking or a steering intervention is output when the inequality $$-(d/vr) \leq \text{sqrt}(2 \cdot \text{deltayFlucht}/|ay|) \cdot \text{alphai} \quad (1)$$

is satisfied, where d represents the distance to the vehicle in front; vr represents the relative velocity of the vehicle in front with respect to one's own vehicle, which, given approach of the two vehicles, is negative; deltayFlucht represents half the width of one's own vehicle minus the minimal distance of the known target object to the extended center vehicle axis of one's own vehicle plus half the object expansion of the known target object perpendicular to the extended center vehicle axis of one's own vehicle; ay represents the average, maximally possible lateral acceleration of the vehicle during an evasive maneuver; and alphai represents a safety factor of less than 1.

Furthermore, it may be advantageous that the non-convertible variables made available are stored either as a data record of all input variables upon occurrence of the triggering signal, or in a class system which records the occurrence frequency of the triggering signal as a function of various safety factors alphai, or only when $$-(vr/d) \cdot \text{sqrt}(2 \cdot \text{deltayFlucht}/|ay|) \cdot \text{alphai} \quad (2)$$

reaches a value which is greater than the smallest value of a fixed number of previously achieved peak values.

It may also be advantageous that a false release of the triggering signal may be determined by evaluating input data, and given the presence of a determined false release, a further data record is stored. A false release in this sense is a triggering signal which turns out to be unwarranted based on the ambient situation and the further travel course.

In addition, it may be advantageous that the data stored in the nonvolatile memory are stored in an encrypted fashion.

DETAILED DESCRIPTION

Figure 1:
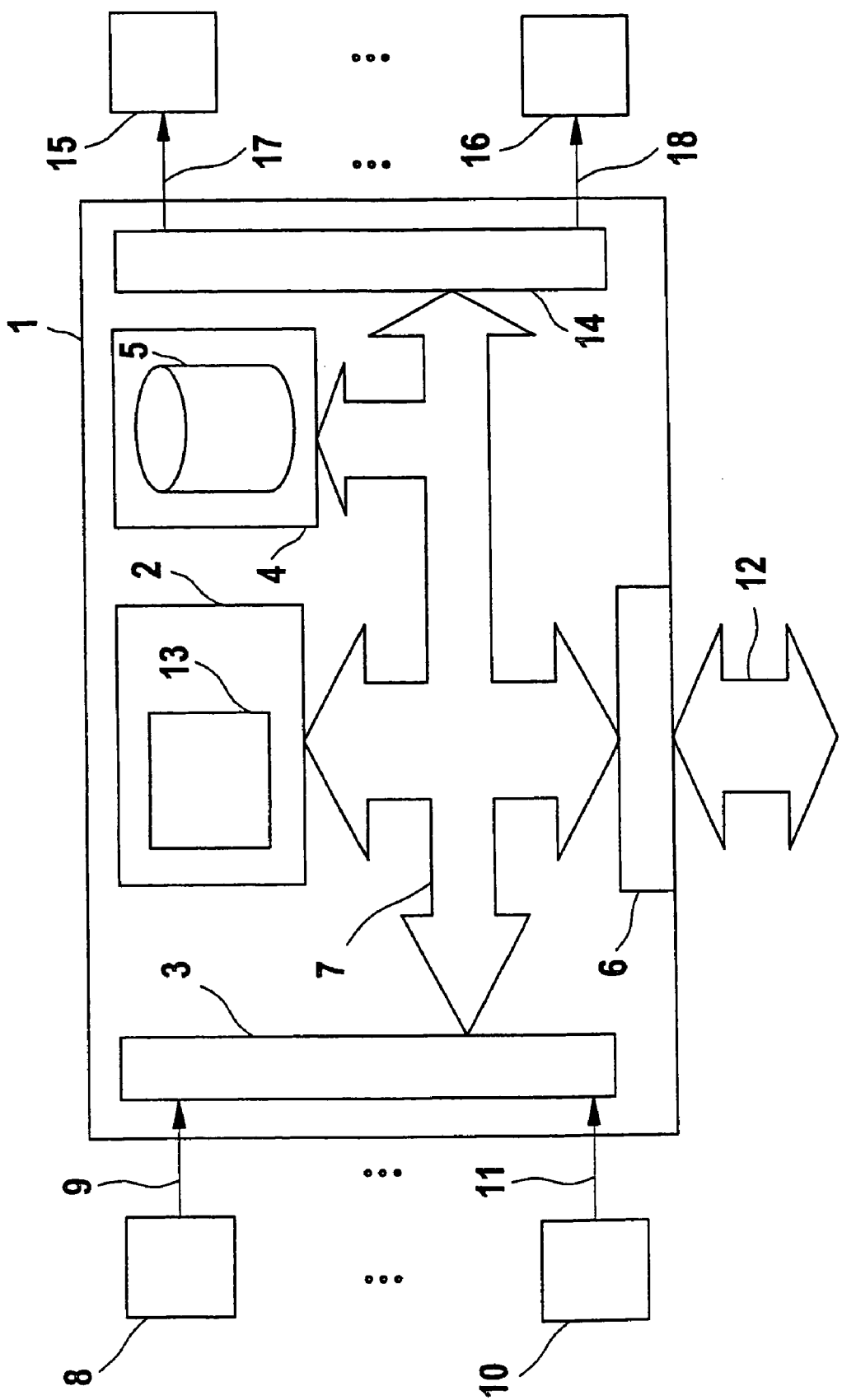
FIG. 1 shows a block diagram of an exemplary embodiment of the control device.

FIG. 1 shows a control device (1) which, inter alia, contains a microprocessor (2) in which, among other things, provided function (13) is implemented. Moreover, control device (1) contains an input circuit (3) via which control device (1) receives input variables (9, 11) from at least one measured-value acquisition device (8, 10). Control device (1) also contains an output circuit (14) via which output variables (17, 18) may be routed to one or more final controlling elements (15, 16). Control device (1) includes an interface (6), via which control device (1) is able to communicate with an external diagnostic unit or analyzing unit. To this end, it may be necessary to connect to interface (6) of control device (1) a communication medium, which may advantageously be an interface cable (12), which in turn is connected to an external diagnostic or analyzing device. It is also possible that the interface, via which the control device communicates with a diagnostic or analyzing unit, not be designed as shown in FIG. 1, but rather that the same CAN bus via which the control device receives and outputs the input and output signals, respectively, be used for diagnostic and analyzing operations. Moreover, control device (1) contains a nonvolatile memory (4) in which data records (5) may be stored if necessary and held in readiness for readout operations. The control device components: input circuit (3), output circuit (14), communication interface (6), microprocessor (2) and nonvolatile memory (4) are interconnected by an internal communication system (7) via which data and information may be exchanged in any direction.

Figure 2:
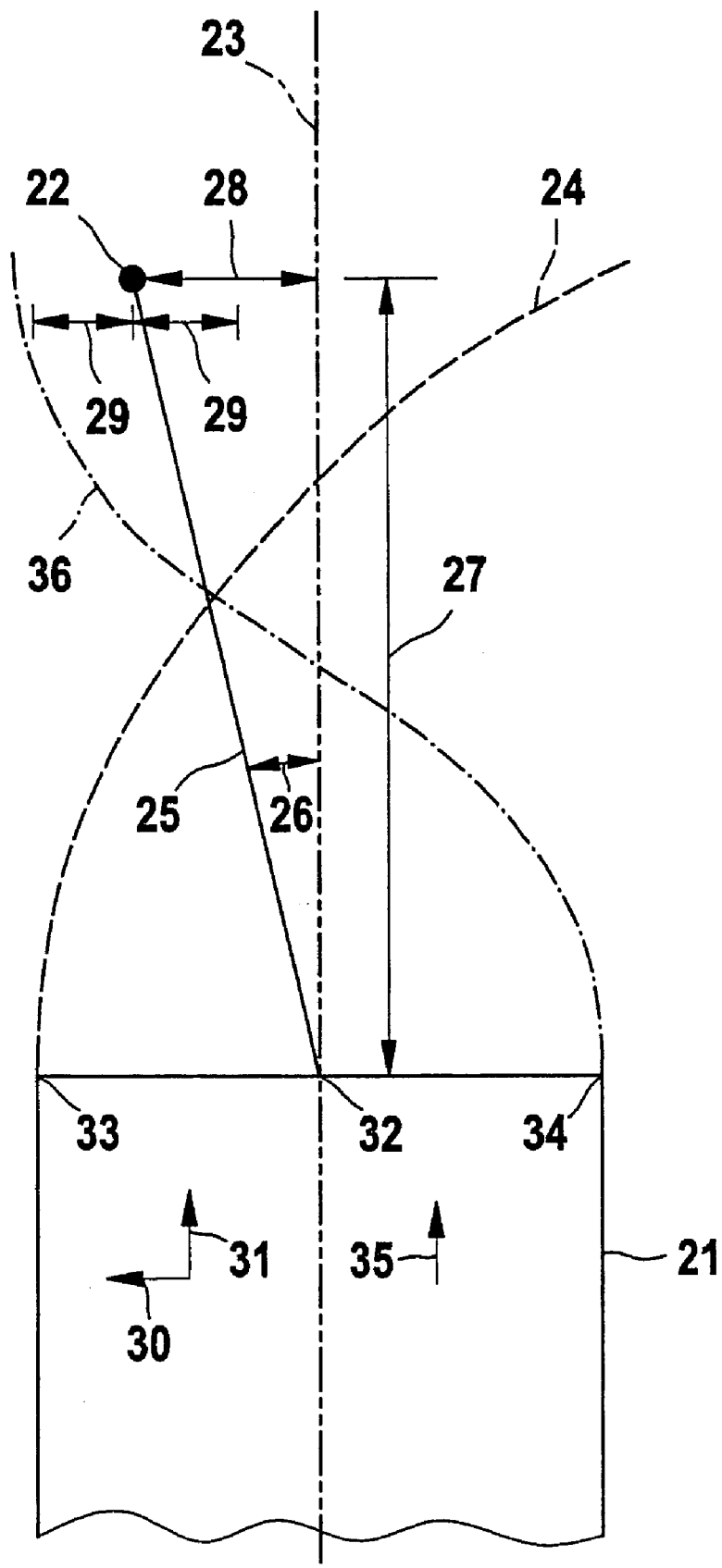
FIG. 2 shows a diagram for assessing the probability of collision.

FIG. 2 shows a sketch with which provided function (13) is able to decide whether the vehicle driver can still avoid an imminent collision in time. Inertial system (21) of the vehicle is made of a longitudinal direction (31) and a transverse direction (30). This vehicle (21) is moving in the direction of longitudinal direction (31) with relative velocity vr (35) with respect to a recognized target object ZO (22). A device (8, 10) for making input variables (9, 11) available—in the present example it is an angular-resolution radar sensor—has detected a target object ZO (22) in distance dstrich (25) and at angle phi (26). This target object may be a vehicle traveling in front, or else a stationary object on the roadway. In this example, the indicated radar sensor is mounted in longitudinal vehicle axis (23), and thus is mounted at vehicle center (32). This vehicle-center position (32) has a lateral offset y=0. In this example, left front vehicle corner (33) may advantageously have a lateral offset of y>0. As a result, right front vehicle corner (34) has a lateral offset of y<0. The distance in longitudinal direction d (27) and lateral offset ym (28) may now be calculated from measured relative polar coordinates dstrich (25) and phi (26). The width of target object ZO, thus the expansion of the target object perpendicular to the longitudinal vehicle axis, may either be predefined by a fixed parameter for the case when the object width cannot be resolved sufficiently finely, or else, given a sufficiently fine resolution by the sensor, may be taken into account by a recognized width calculated from the measured values. In the present exemplary embodiment, this lateral expansion is represented by variable deltayobj (29) which amounts to half the object width. For the further calculation for the detected target object (22), the range between values ym−deltayobj and ym+deltayobj is assumed for the lateral expansion. In the present exemplary embodiment, broken line (24) represents the avoidance trajectory of the left, front vehicle corner. This avoidance trajectory describes a possible movement of vehicle corner (33) with respect to the vehicle in front, which results during an evasive maneuver to avoid a collision relative to target object ZO (22). Also for the instance that vehicle (21) would like to overtake object (22) in front, and to that end falls out of the lane to the left, an avoidance trajectory results as represented by dot-dash line (36), which, however, has a different shape.

The minimal distance at which an evasion is still possible from the standpoint of vehicle dynamics may be compared to the minimal distance at which a collision-avoiding full braking is still possible. It may then be determined that only at small relative velocities is the minimal distance at which an evasion is possible is less than the minimal distance at which a collision-avoiding full braking is still possible. Consequently, only in the case of a small relative velocity with respect to the vehicle in front may a collision be avoided by a braking which could no longer have been avoided by evasion. However, at greater relative velocities, the severity of the collision may be reduced by an active full braking due to the reduction of impact energy (collision mitigation).

In the following, a formulation is described which provides a braking intervention close to the maximum deceleration possible for the vehicle, when an evasion of the vehicle in front is no longer possible. To that end, the variable TTC (time-to-collision) is introduced which describes the period of time until the calculated collision. This remaining time is calculated at $$TTC = d/(-vr) \quad (3).$$

If, using lateral acceleration ay, it is possible within this time to foresee an avoidance trajectory (24) which runs before target object ZO (22), then a steering intervention may still be carried out to avoid collision. Lateral acceleration ay is the average, maximum possible lateral acceleration the vehicle is able to achieve with a steering maneuver. If it is no longer possible within this time to carry out an evasive maneuver with lateral acceleration ay according to the type of avoidance trajectory (24), then the triggering of a panic or full braking is induced.

From the time-acceleration rule, the equation $$t = \operatorname{sqrt}(2 \cdot |y|/|ay|) \quad (4)$$

is known, where ay is the lateral acceleration and y represents the lateral path which may need to be covered to avoid the collision. This lateral path, which may need to be covered before the collision, is designated in the following as deltayFlucht. In the present exemplary embodiment, this lateral path deltayFlucht according to FIG. 2 is calculated from half the vehicle width yl minus the lateral offset of the target object ym (28) plus the lateral object imprecision deltayobj. Thus, yielded from equation 4 is $$t = \operatorname{sqrt}(2 \cdot (yl - |ym| + deltayobj)/|ay|) \quad (5).$$

Since this lateral path may need to be covered before expiration of the time remaining until the collision, equation 3 and equation 5 may be combined to form the following inequality:

$$-(d/vr) \leq \operatorname{sqrt}(2 \cdot (yl - |ym| + deltayobj)/|ay|) \quad (6)$$

This inequality is also established as triggering threshold. As long as this inequality is not satisfied, the driver still has sufficient time to carry out an evasive maneuver, or else he intends merely a passing maneuver. If this inequality, which represents the triggering threshold, is satisfied, then there is a threat of a collision with the traveling or stationary object in front, and a panic or full braking is automatically initiated. The inequality, which describes the triggering threshold, may additionally be expanded by a safety factor, resulting in $$-(d/vr) \leq \operatorname{sqrt}(2 \cdot (yl - |ym| + deltayobj)/|ay|) \cdot alphai \quad (7)$$

By the selection of alphai <1, a reserve may advantageously be planned for in the decision of the inequality. The decision as to whether only a steering intervention or only a braking intervention or a combination of steering and braking intervention should be carried out may advantageously be decided by the same conditional equation, by using different safety factors alphai for each triggering. To this end, it may be necessary that the respective type of intervention was activated beforehand.

If one of the plurality of possible triggering thresholds is exceeded, then a first memory concept provides that the data relevant at this moment for the interpretation of the ambient situation are stored in nonvolatile memory (4) as data record (5). This memory concept has the advantage that after a collision has occurred, the manner in which the accident happened may be reconstructed. According to a further memory concept, provision is made in function (13) for a plurality of triggering thresholds which may advantageously be differentiated by different safety factors alphai. In this case, the triggering frequency is stored in nonvolatile memory (4) as a function of the various triggering thresholds, and thus of the various safety factors alphai. This memory concept may have the advantage that only very little memory capacity may be necessary. Furthermore, this concept may make it possible to ascertain a suitable safety factor alphai empirically. If sufficient memory space is available, then in a similar manner as in the first memory concept, in each case a data record having data relevant for the interpretation of the ambient situation may be stored in nonvolatile memory (4) for each or a maximum number of triggerings.

The triggerings which correspond to an insensitive threshold, e.g. given smaller alphai, may advantageously receive priority in the memory allocation. Thus, in the event that the memory space is no longer sufficient for further triggering data records, a previously stored data record is erased if this triggering was initiated with a more sensitive threshold.

A third memory concept provides that the two expressions to the left and to the right of the inequality sign of triggering inequality (equation 7) are ascertained individually, and a stipulated number of previously achieved peak values is stored. If the instantaneously ascertained value is above the smallest previously stored peak value, then the instantaneous value is newly included, and the previously smallest stored peak value is erased. When working with this memory concept, it may be advantageous that one is able to get along with a very small memory capacity.

Data record (5) may be read out from nonvolatile memory (4) in various ways. Thus, data record (5) may be transmitted via internal communication system (7) and interface (6) to an external unit during the standard inspection. It is also possible, after an accident has taken place, to read out data record (5) from nonvolatile memory (4) in the same manner via internal communication system (7) and interface (6). Moreover, data record (5) may be read out from control device (1) on a spontaneous basis. After data record (5) has been read out from memory (4), it is both possible to erase the previously accumulated data, or else to allow the previously accumulated data to remain in the memory and to complete it in the further course of travel.

One possibly advantageous exemplary embodiment provides that function (13) is activated by an activation signal, which is given from the outside via interface (6) to control device (1) by authorized personnel during a visit at a service station, and thus the non-convertible manipulated variables are additionally given to output circuit (14), and consequently become convertible manipulated variables. If it turns out that test function (13) is suitable for practical application, then in this manner the functionality of control device (1) may be subsequently expanded in an inexpensive and uncomplicated manner. In the same manner, it is possible to deactivate activated test function (13) by way of an externally triggered deactivation signal by authorized personnel, for example, during a stop at a service station, which means the convertible manipulated variables again become non-convertible manipulated variables. This may become necessary for the case when, contrary to expectations, the function turns out to be unreliable, since, for example, it does not react appropriately to special surrounding-field situations.

Moreover, it is possible to provide a false-alarm detection. If triggering threshold according to equation 7 is exceeded, then a triggering signal is initiated which corresponds to a panic or full braking. If, for example, in the further course, the time until collision (TTC) increases again, or an evasion again becomes possible, then it may be that the triggering condition is subsequently no longer satisfied. In this case, provided function (13) is able to recognize automatically that the triggering of a panic or full braking is not appropriate, and this triggering signal corresponds to a false alarm. Upon detection of such a false alarm, data may advantageously also be stored, so that the cause of the false alarm may be analyzed. These data may be the same variables as in the case of a triggering; however, it is also possible that further signals are stored which are used for self-diagnostics, in particular self-diagnostic signals of the connected ambient sensors, as well.

Figure 3:
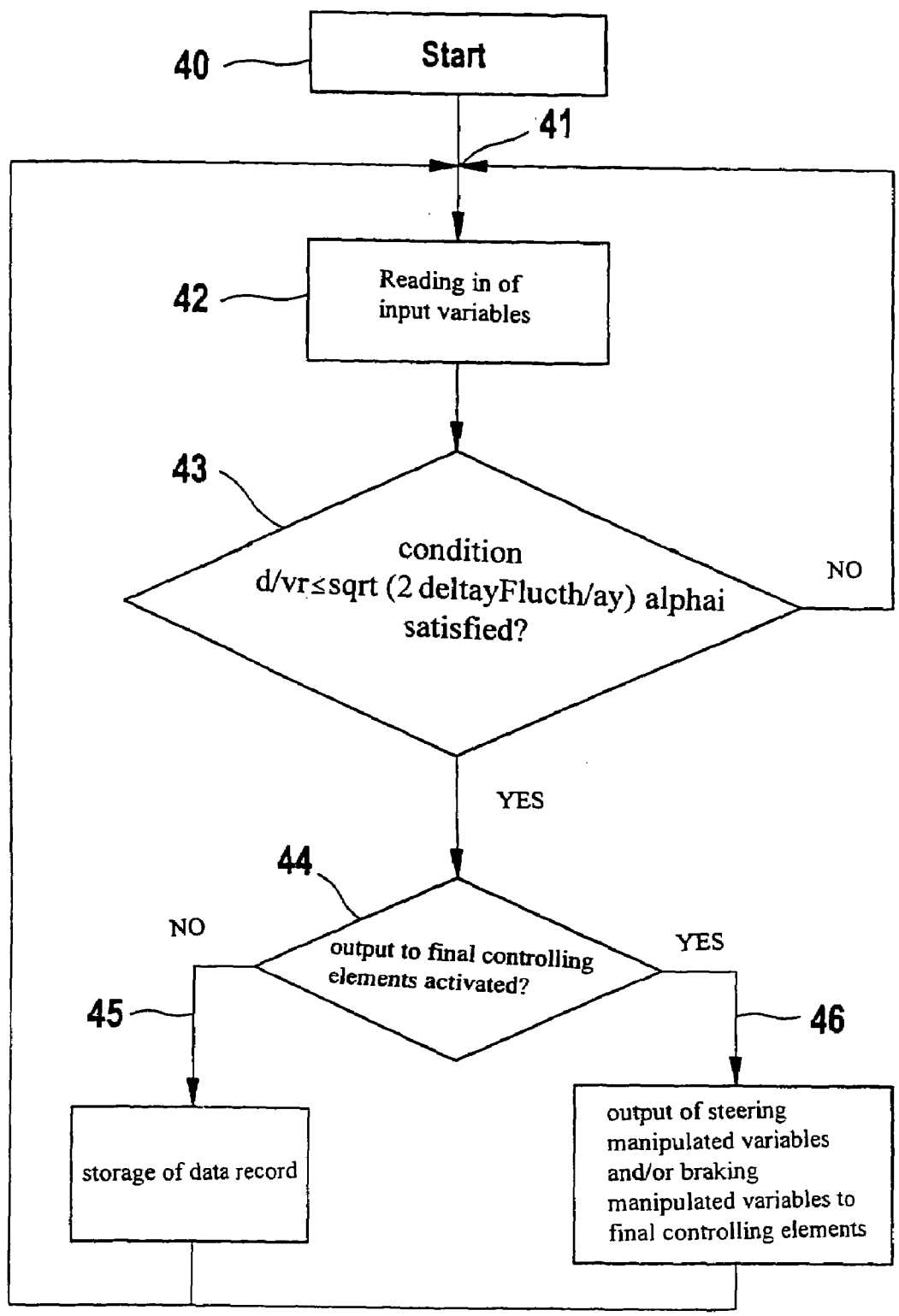
FIG. 3 shows a flowchart of an exemplary embodiment of the present invention.

FIG. 3 shows a flowchart of a possible specific embodiment. After start (40) of the algorithm has been carried out, in whose scope a self-test and an initialization are provided, a first read-in of input variables (42) is implemented. In following step (43), these input variables are inserted into a condition; in the present example, it is an inequality. If the condition shown is not satisfied, then the instantaneous risk of collision is very small and no automatic intervention in braking or steering may be necessary. This condition may be different depending on the type of vehicle function intended in future. Thus, conditions are also possible which are made of a plurality of individual conditions. If the condition indicated in FIG. 3 is not satisfied, then the algorithm branches to "no", and new input variables are read in in a new run-through of block (42). This indicates too small an instantaneous probability of collision, so that no braking and/or steering intervention is to be carried out. Should the condition in block (43) be satisfied, then a high risk of collision may be expected. By a branching from (43) to "yes", prior to triggering of a braking or steering intervention, it is queried in block (44) whether an output to final controlling elements was activated. If this query in block (44) reveals that no output to final controlling elements should be implemented, then the instantaneous values of the signals relevant for the reconstruction of the ambient situation are stored in block (45), and are held in readiness for future readout operations in the memory device. If the query in block (44) reveals that an output of manipulated variables to final controlling elements was activated, then in block (46), a braking and/or steering intervention is triggered and carried out as a function of the recognized instantaneous driving situation. It is also within the scope of an exemplary embodiment of the present invention that an instantaneous data record is stored in response to the triggering of a braking or steering intervention.

After the instantaneous data have been stored in block (45) or after a braking or steering intervention has been carried out in block (46), the sequence of the algorithm is forwarded to point (41), and from there, continued with a read in operation once again in block (42).

A further specific embodiment provides that the data which are stored in the nonvolatile memory of the control device are additionally stored in a nonvolatile memory of a further control unit which is connected to the first control device through a data communication medium. A loss of data because of destruction of the first control device due to an accident may thereby be avoided. The further control unit may be a control unit for controlling any vehicle function such as ABS, electronic stability program, engine management, on-board computer or the like.

What is claimed is:

1. A device for making an output signal available in a motor vehicle, comprising:
    an arrangement configured to generate and hold at least one non-convertible manipulated variable in readiness for at least one readout operation for the motor vehicle, as the output signal;
    wherein the arrangement generates the at least one non-convertible manipulated variable as a function of at least one input variable;
    wherein a plurality of non-convertible manipulated variables are generated by the arrangement, and wherein the plurality of non-convertible manipulated variables represent a triggering of an automatic braking and an implementation of an automatic steering intervention, the automatic braking providing a deceleration which lies in a range of a maximum possible deceleration for the motor vehicle, and the steering intervention providing a steering movement of a plurality of wheels of the motor vehicle such that a timely evasion of an obstacle is made possible.

2. The device as recited in claim 1, wherein the arrangement executes a function that relates to at least one control possibility intended in a future.

3. The device as recited in claim 1, wherein the arrangement processes at least one of a plurality of input variables, the plurality of input variables including at least one of:
    a distance to a forward vehicle;
    a relative velocity of the forward vehicle with respect to the motor vehicle;
    a sway of the forward vehicle relative to the motor vehicle;
    a velocity of the motor vehicle;
    an acceleration of the motor vehicle;
    a yaw rate;
    a lateral acceleration of the motor vehicle;
    a steering wheel angle;
    a relative lateral velocity of the forward vehicle with respect to the motor vehicle;

a height of a detected object;
an expansion of the detected object in a transverse direction; and
a road coefficient of friction.

4. The device as recited in claim 1, further comprising at least one sensor chosen from the group of sensors including:
a radar sensor;
a lidar sensor;
a video sensor;
a multi-video sensor;
a yaw rate sensor;
a steering angle sensor; and
a wheel speed sensor;
wherein the at least one input variable is provided by the at least one sensor.

5. The device as recited in claim 1, wherein the at least one non-convertible manipulated variable is configured to be output by an activation signal to at least one final controlling element, the at least one non-convertible manipulated variable becoming a convertible manipulated variable after being output.

6. The device as recited in claim 1, further comprising a nonvolatile memory device for storing the at least one non-convertible manipulated variable in such a manner that the at least one non-convertible manipulated variable is able to be overwritten only after the at least one readout operation.

7. The device as recited in claim 1, wherein the device is for performing an adaptive cruise control.

8. The device as recited in claim 1, wherein the at least one input variable includes one of a distance to an object in a direction of travel and a relative velocity with respect to the object.

9. A method for making an output signal available in a motor vehicle, comprising:
generating at least one non-convertible manipulated variable for the motor vehicle, as a function of at least one input variable;
storing the at least one non-convertible manipulated variable; and
holding in readiness for a readout operation the at least one non-convertible manipulated variable;
wherein the generating, storing, and holding in readiness of the at least one non-convertible manipulated variable are performed with an aid of an arrangement provided in a control device;
wherein a plurality of non-convertible manipulated variables are generated, and wherein the plurality of non-convertible manipulated variables represent:
a triggering of an automatic braking, a deceleration that lies in a range of a maximum possible deceleration for the motor vehicle being provided as the automatic braking; and
an implementation of an automatic steering intervention, a steering movement of a plurality of wheels of the motor vehicle being provided such that a timely evasion of an obstacle is made possible as the steering intervention.

10. The method as recited in claim 9, wherein the method represents a control possibility intended in a future.

11. The method as recited in claim 9, wherein:
the at least one non-convertible manipulated variable is configured to trigger at least one of a braking and a steering intervention, the braking lying in a range of a maximum possible deceleration for the motor vehicle, the steering intervention providing a steering movement of a plurality of wheels of the motor vehicle for a timely evasion of an obstacle; and
the at least one non-convertible manipulated variable is output when the inequation $$-(d/vr) \leq \mathrm{sqrt}(2 \cdot \mathrm{deltayFlucht}/|ay|) \cdot \mathrm{alphai}$$

is satisfied, where
d represents a distance to a forward vehicle,
vr represents a relative velocity of the forward vehicle with respect to the motor vehicle,
deltayFlucht represents half of a width of the motor vehicle minus an amount of a lateral offset of a detected target object with respect to an extended center vehicle axis of the motor vehicle plus half an object expansion of the detected target object perpendicular to the extended center vehicle axis,
ay represents an average, maximum possible lateral acceleration of the motor vehicle during an evasive maneuver, and
alphai represents a safety factor, the safety factor being one of less than one and equal to one.

12. The method as recited in claim 9, wherein the storing of the at least one non-convertible manipulated variable is performed as one of:
as a data record of all input variables upon occurrence of a triggering signal;
in a class system which records an occurrence frequency of the triggering signal as another function of at least one safety factor; and
only when $(-(vr/d) \cdot (2 \cdot \mathrm{deltayFlucht}/|ay|)^{1/2} \cdot \mathrm{alphai})$ reaches a value which is greater, than a smallest value of a fixed number of previously reached peak values, where
d represents a distance to a forward vehicle,
vr represents a relative velocity of the forward vehicle with respect to the motor vehicle,
deltayFlucht represents half of a width of the motor vehicle minus an amount of a lateral offset of a detected target object with respect to an extended center vehicle axis of the motor vehicle plus half an object expansion of the detected target object perpendicular to the extended center vehicle axis,
ay represents an average, maximum possible lateral acceleration of the motor vehicle during an evasive maneuver, and
alphai represents a safety factor, the safety factor being one of less than one and equal to one.

13. The method as recited in claim 9, further comprising:
determining whether a false release of a triggering signal has occurred by evaluating the at least one input variable; and
if a false release has occurred, storing a further data record.

14. The method as recited in claim 9, wherein the at least one input variable includes one of a distance to an object in a direction of travel and a relative velocity with respect to the object.

* * * * *